United States Patent
Lee et al.

(10) Patent No.: US 10,266,112 B1
(45) Date of Patent: Apr. 23, 2019

(54) SOUND CONTROL METHOD FOR HYBRID VEHICLE

(71) Applicants: HYUNDAI MOTOR COMPANY, Seoul (KR); KIA Motors Corporation, Seoul (KR)

(72) Inventors: Dong Chul Lee, Anyang-si (KR); In Soo Jung, Suwon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 15/826,617

(22) Filed: Nov. 29, 2017

(30) Foreign Application Priority Data

Oct. 20, 2017 (KR) .................. 10-2017-0136543

(51) Int. Cl.
*B60Q 1/22* (2006.01)
*B60Q 5/00* (2006.01)
*B60K 6/22* (2007.10)

(52) U.S. Cl.
CPC ............ *B60Q 5/008* (2013.01); *B60K 6/22* (2013.01); *B60Y 2200/92* (2013.01); *Y10S 903/904* (2013.01)

(58) Field of Classification Search
CPC ...................................... H04L 1/00; G06F 1/00
See application file for complete search history.

(56) References Cited

U.S. PATENT DOCUMENTS

| | | | | | |
|---|---|---|---|---|---|
| 2013/0343570 | A1* | 12/2013 | Orth | ............... | G10K 15/02 381/86 |
| 2015/0002287 | A1* | 1/2015 | Valeri | ............... | B60Q 5/005 340/441 |
| 2017/0123754 | A1* | 5/2017 | Kwon | ............... | G05B 15/02 |
| 2017/0330550 | A1* | 11/2017 | Lee | ............... | F02B 77/13 |

FOREIGN PATENT DOCUMENTS

KR    10-2013-0057851 A    6/2013

* cited by examiner

*Primary Examiner* — Shirley Lu
(74) *Attorney, Agent, or Firm* — McDonnell Boehnen Hulbert & Berghoff LLP

(57) ABSTRACT

Disclosed is a sound control method for a hybrid vehicle having both an engine and a motor as driving power sources, the method including: checking a driving condition of the hybrid vehicle; calculating a first virtual sound optimizing an engine sound by extracting main order components of the engine based on an engine RPM and engine load data, and by optimizing an arrangement of the extracted main order components of the engine or by adjusting output levels thereof; calculating a second virtual sound generating an optimized engine sound by extracting order components of the motor based on a motor RPM and motor load data, converting the extracted order components of the motor into corresponding main order components of the engine, and by optimizing an arrangement of the converted main order components of the engine or by adjusting output levels thereof; and outputting the calculated first virtual sound or the second virtual sound to a sound device.

8 Claims, 5 Drawing Sheets

SOUND CONTROL METHOD FOR HYBRID VEHICLE

CROSS REFERENCE TO RELATED APPLICATION

The present application claims priority to Korean Patent Application No. 10-2017-0136543, filed Oct. 20, 2017, the entire contents of which is incorporated herein for all purposes by this reference.

BACKGROUND

Technical Field

The present invention generally relates to a sound control method for a hybrid vehicle having both an engine and a motor as driving power sources, whereby an optimized vehicle sound is provided to a driver according to a driving condition of the hybrid vehicle.

Description of the Related Art

Recently, due to the introduction of vehicles such as hybrid vehicles that use both fossil fuel and a battery as driving power sources, and electric vehicles that use a battery as a driving power source, installation of a sound-generating device in an eco-friendly vehicle has become mandatory because these types of vehicles generate little sound.

In the United States, legislation is being considered requiring that an eco-friendly vehicle generate noise above a certain level.

In general, vehicle noise, lack of vehicle noise, or monotonous vehicle noise may be unpleasant for a driver. In addition, pedestrians may find vehicle noise unpleasant. However, vehicle noise may prevent accidents because pedestrians audibly recognize the proximity of a nearby vehicle through such a noise.

In addition, silence or monotone noise within a hybrid vehicle has a negative impact on a driver. For example, during a motor driving mode, because there is no unique sound from an internal combustion engine, the driving experience may be degraded or the driver may risk falling asleep. In addition, there may be driving discomfort generated during regenerative braking.

The foregoing is intended merely to aid in the understanding of the background of the present invention, and is not intended to mean that the present invention falls within the purview of the related art that is already known to those skilled in the art.

SUMMARY OF THE DISCLOSURE

The present disclosure addresses the above problems by providing a sound control method for a hybrid vehicle in which an interior sound of the hybrid vehicle is consistently maintained, and a suitable virtual sound is provided to a driver according to a driving condition, whether or not the driver drives at a steady speed. Thus, the driver may not feel discomfort due to sound changes during driving, and thus the driving experience is improved.

In order to achieve the above object, according to one example embodiment, there is provided a sound control method for a hybrid vehicle having both an engine and a motor as driving power sources, the method including the steps of: checking, by a controller, a driving condition of the hybrid vehicle; when the driving condition of the hybrid vehicle is an engine driving condition, calculating, by the controller, a first virtual sound for optimizing an engine sound by extracting main order components of the engine based on an engine revolution per minute (RPM) and engine load data, and by optimizing an arrangement of the extracted main order components of the engine or by adjusting output levels thereof; when the driving condition of the hybrid vehicle is a motor driving condition (EV mode), calculating, by the controller, a second virtual sound for generating an optimized engine sound by extracting order components of the motor based on a motor RPM and motor load data, by converting the extracted order components of the motor into corresponding main order components of the engine, and by optimizing an arrangement of the converted main order components of the engine or by adjusting output levels thereof; and after calculating the first virtual sound or the second virtual sound, outputting, by the controller, the calculated first virtual sound or the second virtual sound to a sound device of the hybrid vehicle.

In a further embodiment, the sound control method further includes: after calculating the first virtual sound or the second virtual sound, checking, by the controller, whether or not a differential value of the driving speed of the vehicle is 0 (i.e. the vehicle speed is steady), wherein if the differential value of the driving speed is 0, the controller ceases outputting the first virtual sound or the second virtual sound.

In a further embodiment, When the differential value of the driving speed is not 0, the sound control method may further include: adding, by the controller, an acceleration characteristic to the first virtual sound or the second virtual sound, and outputting the added virtual sound to the sound device, the acceleration characteristic being calculated based on at least one of an RPM increase in the engine or the motor, a rate of change in the driving speed, and a pedal opening rate.

In a further embodiment, the sound control method may further include: after calculating the first virtual sound or the second virtual sound, checking, by the controller, whether or not a driving mode of the hybrid vehicle is any one of an ECO mode, a COMPORT mode, and a SPORT mode; and after the checking of the driving mode, adding, by the controller, a driving mode characteristic to the first virtual sound or the second virtual sound according to the checked driving mode, and outputting the added virtual sound to the sound device. The driving mode characteristic may be preset to amplify output levels of the main order components of the engine. In particular the driving mode characteristic may be set so that the amplification level gradually increases between the ECO mode, the COMPORT mode, and the SPORT mode.

In a preferred embodiment, for calculating the first virtual sound, the controller may collect engine load data based on at least one of an engine vibration sensor, a combustion pressure sensor, a boost pressure sensor, and an exhaust pressure sensor.

In a preferred embodiment, for calculating the second virtual sound, the controller may collect motor load data based on at least one of a motor vibration sensor, a voltage sensor, and a current sensor.

In a further embodiment, when the driving condition is switched from the engine driving condition to the motor driving condition, or vice versa, the sound control method may further include: calculating, by the controller, a third virtual sound representing a target driving condition, and causing the controller to gradually alter the virtual sound from the virtual sound of a previous driving condition to the third virtual sound over a predetermined time period; and outputting, by the controller, the calculated third virtual sound and gradual transition to the sound device.

According to the various embodiments of the sound control method for the hybrid vehicle configured as described above, a vehicle sound suitable to the vehicle acceleration experience may be provided according to an engine driving condition. Therefore, the driver may enjoy an improved acceleration experience.

In addition, in a motor driving condition, the acceleration experience may be improved by generating a virtual engine sound according to a driving situation.

In addition, the driving experience may be improved by gradually changing the sound pressure level during a change in the driving condition of the hybrid vehicle.

In addition, the driving experience is improved because a suitable output level of the virtual sound is provided according to a speed, an acceleration, a deceleration, and/or a driving mode of the hybrid vehicle.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Hereinbelow, example embodiments of a sound control method for a hybrid vehicle will be described in detail with reference to the accompanying drawings.

Figure 1:
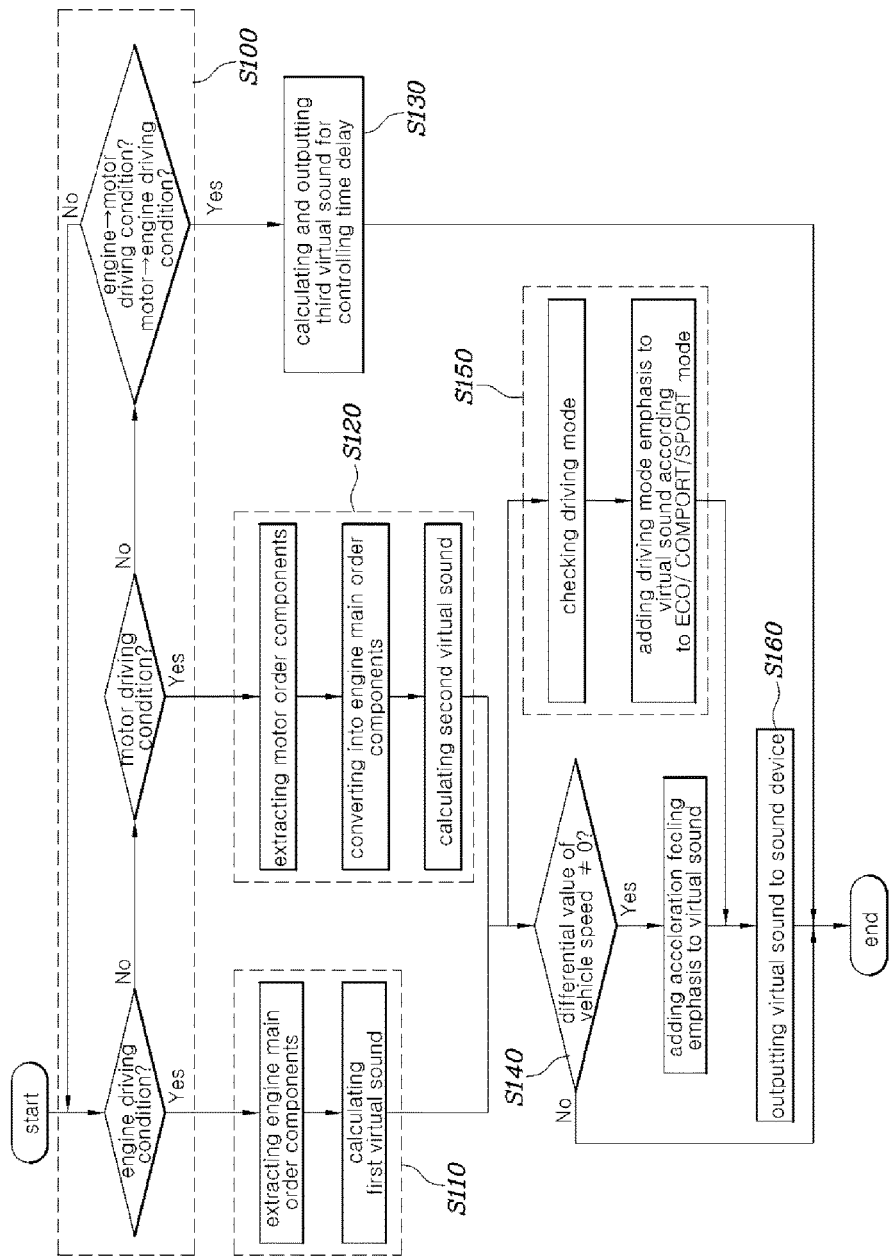
FIG. 1 is a flowchart showing a sound control method for a hybrid vehicle according to an example embodiment.
Figure 2:
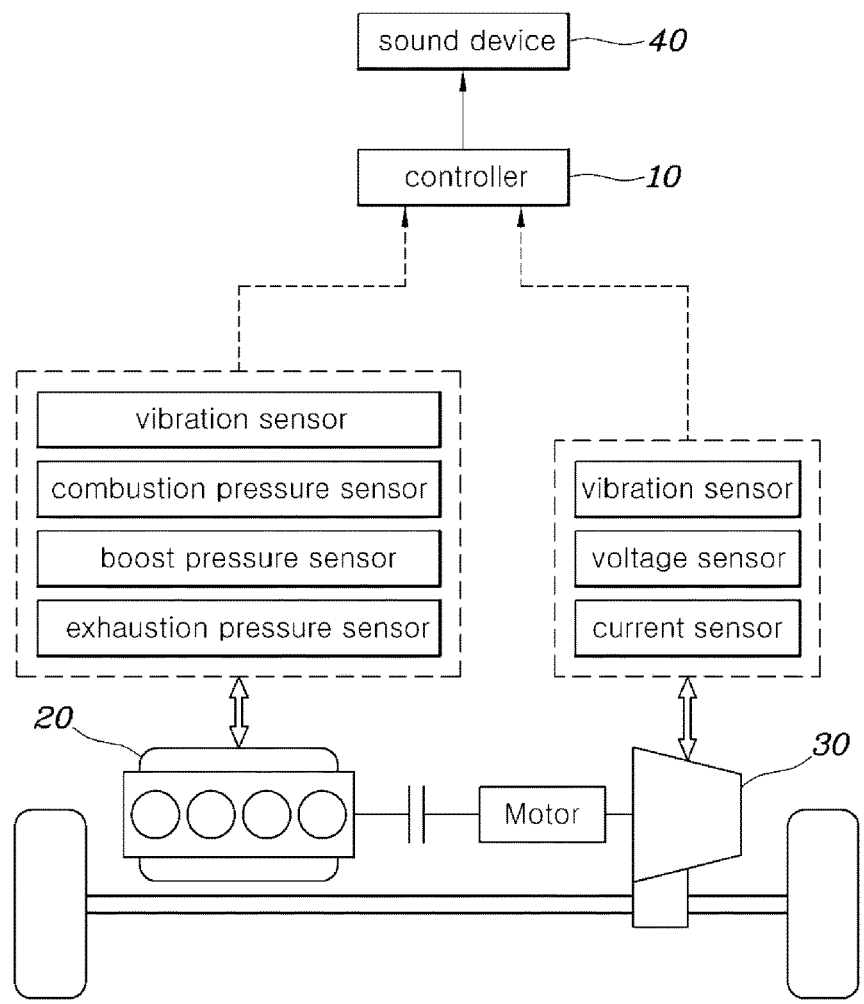
FIG. 2 is a view showing a sound control system for a hybrid vehicle according to an example embodiment.

FIG. 1 is a flowchart showing a sound control method for a hybrid vehicle according to an example embodiment, and FIG. 2 is a view showing a sound control system for a hybrid vehicle according to an example embodiment.

Referring to FIG. 1 and FIG. 2, the sound control method for the hybrid vehicle having an engine 20 and a motor 30 as driving power sources, may include: checking, by controller 10, a driving condition of the hybrid vehicle (step S100); when the driving condition determined in step (S100) is an engine driving condition (HEV mode), calculating, by the controller 10, a first virtual sound optimizing an engine sound by extracting main order components of engine 20 based on an engine RPM and engine load data, and optimizing an arrangement of the main order components or adjusting output levels thereof (step S110); when the driving condition determined in step (S110) is a motor driving condition (EV mode), calculating, by controller 10, a second virtual sound generating an optimized engine sound by extracting order components of motor 30 based on a motor RPM and motor load data, converting the extracted order components of motor 30 into corresponding main order components of engine 20, and optimizing an arrangement of the converted main order components of engine 20 or adjusting output levels thereof (step S120); and, after calculating the first virtual sound or the second virtual sound, outputting, by controller 10, the calculated first virtual sound or the second virtual sound to a sound device 40 of the hybrid vehicle (step S160).

Broadly, in the sound control method for the hybrid vehicle of according to this example embodiment, when the driving condition of the hybrid vehicle is set to an HEV mode that uses engine 20 as the main driving power source, a first virtual sound that is calculated consistent with the characteristics of engine 20 is output to sound device 40 of the hybrid vehicle. When the driving condition of the hybrid vehicle is set to an EV mode that uses motor 30 as the main driving power source, a second virtual sound that is calculated consistent with the characteristics of motor 30 is output to sound device 40 of the hybrid vehicle. Therefore, a vehicle sound that is suitable for a vehicle state is provided.

In detail, first, in step (S100), controller 10 checks the driving condition of the hybrid vehicle. In a further example embodiment, controller 10 may check a driving condition of a current vehicle by communicating with a hybrid control unit (HCU).

When the driving condition is determined to be an engine driving condition (hybrid electric vehicle mode: HEV mode), noise is generated during the combustion process of the internal combustion engine. Therefore, in step (S120), controller 10 calculates a first virtual sound for minimizing combustion noise and providing a dynamic driving experience to a driver, and outputs the calculated first virtual sound to sound device 40 in step (S160).

Figure 3:
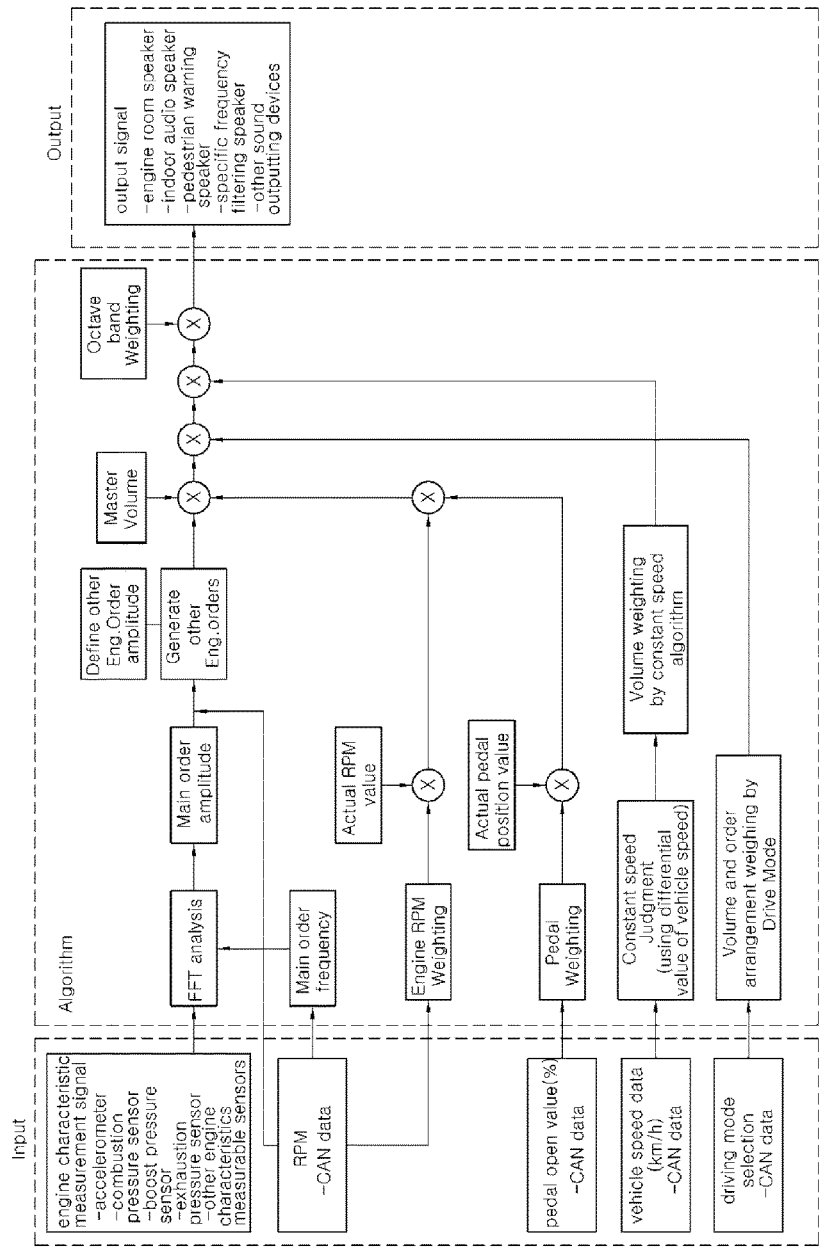
FIG. 3 is a view showing a sound control flow according to an example embodiment when the hybrid vehicle is in an engine driving condition.

FIG. 3 is a view showing a sound control flow according to an example embodiment when the hybrid vehicle is in an engine driving condition. Referring to FIG. 1 to FIG. 3, when the driving condition of the hybrid vehicle is an engine driving condition, controller 10 extracts a main order frequency of engine 20 from an engine RPM, and extracts main order components required for controlling a vehicle sound among order components of engine 20 by performing a fast Fourier transform (FFT) analysis based on the extracted main order frequency and engine load data. Controller 10 adjusts an arrangement of the extracted main order components, adjusts a level difference between respective order components according to an engine characteristic, and outputs the adjusted arrangement and level difference to sound device 40. Thus, a vehicle sound optimized to the driving condition may be provided. Herein, the main order component of the engine means a specific order component required for controlling a vehicle sound among all measured engine order components such as engine sound, engine vibration, etc.

In addition, when the driving condition of the hybrid vehicle is a motor driving condition (electric vehicle mode: EV mode), white noise is generated while the motor is rotated. Controller 10 outputs a virtual engine sound in association with a driving speed of the hybrid vehicle by using sound device 40 so that the driver may hear a natural engine sound during the motor driving condition whereby the driving experience may be improved.

Figure 4:
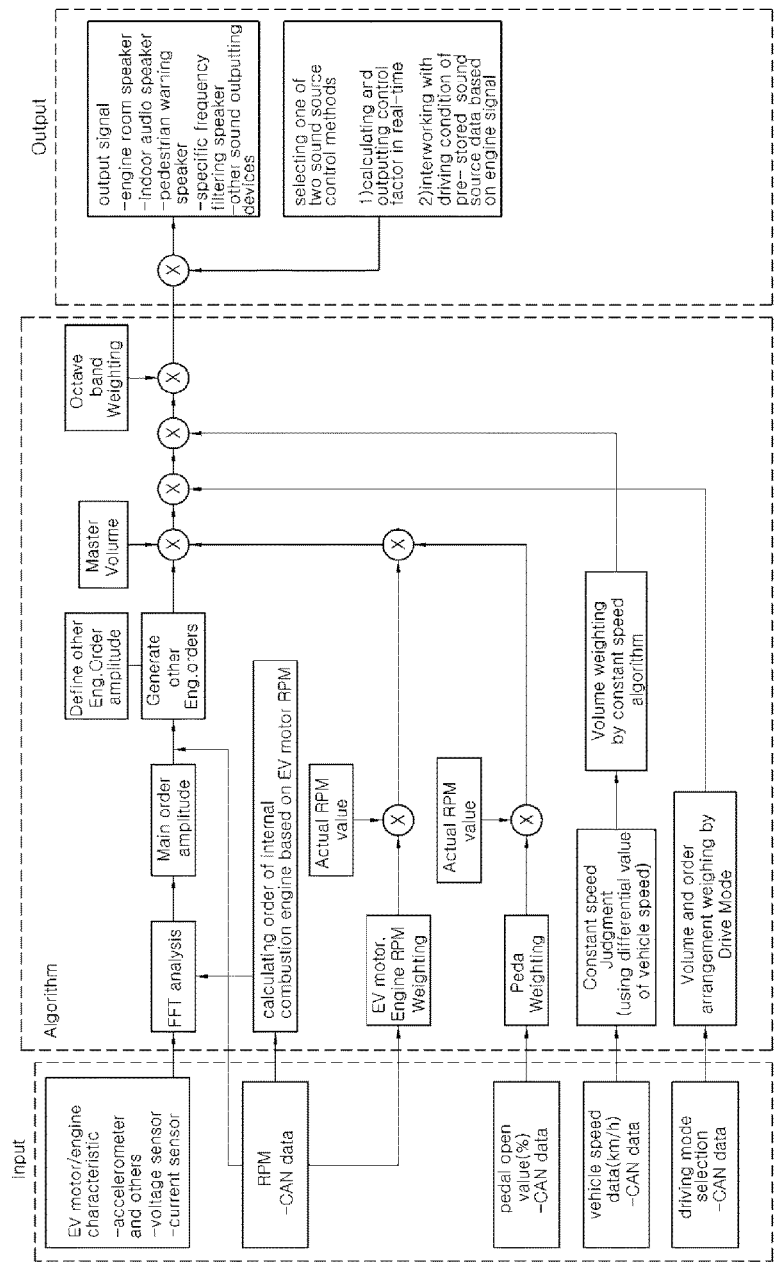
FIG. 4 a view showing a sound control flow according to an example embodiment when the hybrid vehicle is in a motor driving condition.

FIG. 4 is a view showing a sound control flow according to an example embodiment when the hybrid vehicle is in a motor driving condition. Referring to FIG. 1, FIG. 2, and FIG. 4, when the driving condition of the hybrid vehicle is a motor driving condition, controller 10 extracts order components of motor 30 from a motor RPM, and calculates order components of engine 20 corresponding to the extracted order component of motor 30. In a preferred embodiment, the order components of motor 30 are converted into the main order components of engine 20 by performing a FFT analysis based on the calculated order components of engine 20 and motor load data. Then, controller 10 adjusts an arrangement of the converted main order components of engine 20 and a level difference between respective order components, and outputs the adjusted arrangement and the level difference to sound device 40 so that an optimized vehicle sound may be provided to the driver during a motor driving condition.

In particular, in a motor driving condition, controller 10 may calculate in real-time a second virtual sound according to the main order component of engine 20, and output the calculated second virtual sound to sound device 40. Alternatively, controller 10 may be set to store a second virtual sound calculated according to a motor characteristic, and output the pre-stored second virtual sound to sound device 40 when a driving situation corresponding to the stored virtual sound occurs in a motor driving condition.

Generally, main order components of a four-cylinder engine are extracted as secondary order components, and main order components of a six-cylinder engine are extracted as tertiary order components. In addition, primary order components of motor 30 are generated every rotation of motor 30, in the example embodiments, and the generated primary order components are converted into tertiary order components when engine 20 is an six-cylinder engine. Thus, a virtual engine sound suitable for the motor characteristic may be output.

In a preferred embodiment, sound device 40 may include any of an engine compartment speaker outputting a sound to the vehicle cabin, a cabin audio speaker, a specific frequency filtering speaker, and a pedestrian warning speaker outputting a sound to the exterior of the vehicle.

Meanwhile, referring to FIG. 1 to FIG. 4, in invention further example embodiment, after calculating the first virtual sound or the second virtual sound in steps (S110) or (S120), in step (S140) controller 10 may check whether or not a differential value of the driving speed is 0. When the differential value of the driving speed is determined to be 0 in step (S140), controller 10 may cease outputting the first virtual sound or the second virtual sound of step (S160).

In other words, the differential value of the driving speed is an index representing an instant flow of the driving speed. When the differential value of the driving speed is determined to be 0, it may be determined that the driver is driving the hybrid vehicle at a steady speed.

When a virtual engine sound is output through sound device 40 while the driver drives the hybrid vehicle at a steady speed as above, NVH (noise, vibration and harshness) performance of the hybrid vehicle is degraded. In order to maintain silence for improving the NVH performance of the hybrid vehicle, outputting the first virtual sound or the second virtual sound of step (S160) may be stopped. Alternatively, silence of the hybrid vehicle may be improved by converting and outputting the first virtual sound or the second virtual sound into a sound source having a phase opposite to the measured vehicle interior noise.

When the differential value of the driving speed is determined not to be 0 in step (S140), in step (S160) controller 10 adds an acceleration characteristic to the first virtual sound or the second virtual sound, and outputs the added virtual sound. The acceleration characteristic is calculated based on at least one of an RPM increase in the engine or the motor, a rate of change in the driving speed, and a pedal opening rate.

In other words, when the differential value of the driving speed is not 0, it is determined that the driver is not driving at a steady speed. Controller 10 determines whether the hybrid vehicle is in an acceleration state or a deceleration state by using at least one of an RPM increase in the engine or the motor received from an engine control unit (ECU) and a motor control unit (MCU), a rate of change in the driving speed received from a driving speed sensor, and a pedal opening rate received from an accelerator pedal sensor (APS), and outputs a suitable corresponding virtual sound.

It is preferable to set the acceleration characteristic so that amplifying amounts of output levels of the main order components of the engine are increased as acceleration of the hybrid vehicle increases.

When controller 10 detects that the hybrid vehicle is in an acceleration state by using the RPM increase in the engine or the motor, the rate of change in the driving speed, and the acceleration pedal opening rate data, in order to provide an engine sound suitable for the corresponding acceleration characteristic, controller 10 amplifies the output levels of the main order components of engine 20, and outputs the amplified output levels to sound device 40 to provide an improved driving experience to the driver.

The sound control method for the hybrid vehicle according to a further embodiment further includes step (S150) of checking, by controller 10, whether a driving mode of the hybrid vehicle is an ECO mode, a COMPORT mode, or a SPORT mode after calculating the first virtual sound or the second virtual sound of step (S110) or step (S120).

After checking the driving mode in step (S150), controller 10 performs step (S160) by adding a driving mode characteristic to the first virtual sound or the second virtual sound, and outputting the modified virtual sound. In a preferred embodiment, the driving mode characteristic is preset so that the output levels of the main order components of the engine are amplified according to the driving mode. The driving mode characteristic is set so that amplification of the output levels gradually increases from ECO mode to COMPORT mode to SPORT mode.

In other words, controller 10 provides a vehicle sound that is suitable to the driving mode of the hybrid vehicle. In an ECO mode, a silent sound, in a COMPORT mode, a clear sound, and in a SPORT mode, a dynamic sound is provided so that the driver may feel different driving experiences according to the driving mode.

In a preferred embodiment, in calculating the first virtual sound of step (S110), controller 10 may collect the engine load data based on at least one of an engine vibration sensor, a combustion pressure sensor, a boost pressure sensor, and an exhaust pressure sensor.

Generally, during operation of engine 20, noise and vibration are generated due to the power stroke of engine 20, and the main order components of the engine may be extracted by using information of the above engine noise and vibration. Therefore, in order to detect a movement characteristic of engine 20, vibration of engine 20 may be directly measured by an engine sensor, or may be indirectly measured by using information about combustion pressure, boost pressure, and exhaust pressure, so that controller 10 may generate a vehicle sound suitable for the movement characteristic of engine 20 based on the directly or indirectly measured vibration data.

Similarly, in calculating the second virtual sound of step (S120), controller 10 may collect the motor load data based on at least one of a motor vibration sensor, a voltage sensor, and a current sensor.

In other words, in order to measure a vibration characteristic generated by operating motor 30, a vibration sensor may be directly used. Alternatively, the vibration characteristic of motor 30 may be indirectly measured by using a voltage sensor or a current sensor in which a vibration characteristic is pre-mapped according to a voltage or current of motor 30.

Therefore, controller 10 adjusts a target arrangement of the main order components of the engine and target output levels thereof according to the vibration characteristic of engine 20 or motor 30, and provides to the driver a vehicle sound suitable for the driving performance of the hybrid vehicle. Thus, the driving experience of the driver is improved.

When the driving condition is switched from the engine driving condition to the motor driving condition, or vice versa, in step (S100), the sound control method of the hybrid vehicle may further include step (S130) of calculating, by controller 10, a third virtual sound representing a target driving condition, and causing the controller to gradually alter the virtual sound from the virtual sound of a previous driving condition to the third virtual sound over a predetermined time period; and outputting, by the controller, the calculated third virtual sound and gradual transition to the sound device.

In other words, because there is a noticeable difference in a vehicle sound when the hybrid vehicle is in an engine driving condition or in a motor driving condition, e the driver may experience discomfort because he or she senses a noticeable difference in the vehicle sound when the driving condition switches.

Using the example embodiment described above, the driving experience of the driver may be improved because he or she may not sense any difference in the vehicle sound when the driving condition switches. By outputting through the third virtual sound through sound device 40 and gradually changing the sound pressure during the transition over a predetermined period, noise discomfort to the driver is minimized.

Figure 5:
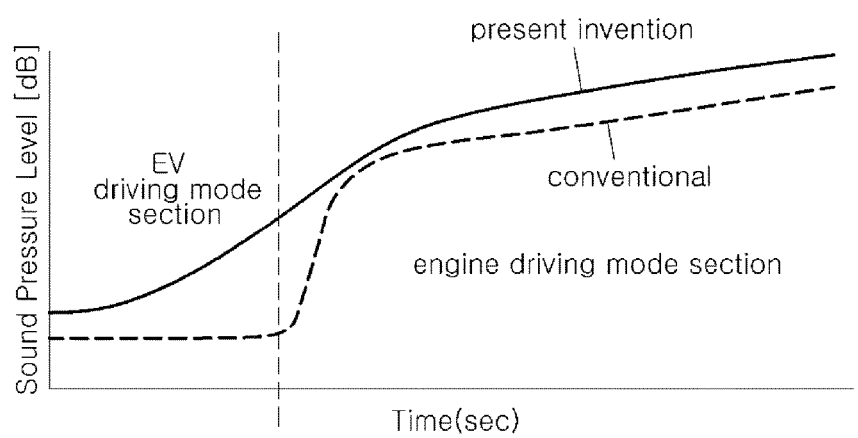
FIG. 5 is a graph of variation in the sound pressure level of the hybrid when a virtual sound is output to a sound device according to an example embodiment.

FIG. 5 is a graph of the variation in sound pressure level of the hybrid vehicle when a virtual sound is output to a sound device according to an example embodiment.

As shown in FIG. 5, conventionally, when the driving mode is switched from an EV mode to an HEV mode which uses an internal combustion engine, a noticeable difference in sound pressure is generated due to an airborne sound that is transmitted ed from the engine. However, by applying the example embodiments described above, the driver may not sense the difference caused by a sound change because the sound pressure is gradually increased during the shift from EV mode to HEV mode.

According to the sound control method for the hybrid vehicle configured as described above, a vehicle sound suitable for vehicle acceleration may be provided according to an engine driving condition. Therefore, the driver may experience an improved acceleration experience.

In addition, in a motor driving condition, the acceleration experience may be improved by generating a virtual engine sound according to a driving situation.

In addition, the driver may not experience discomfort caused by a sound change because a sound pressure level can be gradually adjusted when the driving condition of the hybrid vehicle is switched.

In addition, the driver may feel an improved driving experience because a suitable output level of the virtual sound is provided according to a speed, an acceleration, a deceleration, and/or a driving mode of the hybrid vehicle.

Although example embodiments have been described for illustrative purposes, those skilled in the art will appreciate that various modifications, additions and substitutions are possible, without departing from the scope and spirit of the invention as disclosed in the accompanying claims.

What is claimed is:

1. A sound control method for a hybrid vehicle having both an engine and a motor as driving power sources, the method comprising:
   checking, by a controller, a driving condition of the hybrid vehicle;
   when the driving condition of the hybrid vehicle is an engine driving condition, calculating, by the controller, a first virtual sound for optimizing an engine sound by extracting main order components of the engine based on an engine RPM and engine load data, and by optimizing an arrangement of the extracted main order components of the engine or by adjusting output levels thereof;
   when the driving condition of the hybrid vehicle is a motor driving condition, calculating, by the controller, a second virtual sound for generating an optimized engine sound by extracting order components of the motor based on a motor revolution per minute and motor load data, converting the extracted order components of the motor into corresponding main order components of the engine, and by optimizing an arrangement of the converted main order components of the engine or by adjusting output levels thereof; and
   after calculating the first virtual sound or the second virtual sound, outputting, by the controller, the calculated first virtual sound or the calculated second virtual sound to a sound device of the hybrid vehicle;
   wherein when the driving condition is switched between an engine driving condition and a motor driving condition, the method further includes:
   calculating, by the controller, a third virtual sound representing a target driving condition,
   causing the controller to gradually alter the virtual sound from the virtual sound of a previous driving condition to the third virtual sound over a predetermined time period; and
   outputting, by the controller, the calculated third virtual sound and gradual transition to the sound device.

2. The method of claim 1, further comprising: after calculating the first virtual sound or the second virtual sound checking, by the controller, a differential value of a driving speed.

3. The method of claim 2, wherein
   when the calculated differential value of the driving speed is 0, the controller ceases outputting the first virtual sound or the second virtual sound; and when the differential value of the driving speed is not 0, the method further includes: adding, by the controller, an acceleration characteristic to the first virtual sound or the second virtual sound, and outputting the added virtual sound to the sound device.

4. The method of claim 3, wherein the acceleration characteristic is calculated based on at least one of an RPM increase in the engine or the motor, a rate of change in the driving speed, and a pedal opening rate.

5. The method of claim 1, further comprising:
   after calculating the first virtual sound or the second virtual sound, checking, by the controller, whether or not a driving mode of the hybrid vehicle is any one of an ECO mode, a COMPORT mode, and a SPORT mode; and adding, by the controller, a driving mode characteristic to the first virtual sound or the second virtual sound according to the determined driving mode, and outputting the added virtual sound to the sound device.

6. The method of claim 5 wherein the driving mode characteristic is preset to amplify output levels of the main order components of the engine, and wherein the driving mode characteristic is set to gradually increase amplification of the output levels as driving mode shifts from an ECO mode to a COMPORT mode, to a SPORT mode.

7. The method of claim 1, wherein in calculating the first virtual sound, the controller collects the engine load data based on at least one of an engine vibration sensor, a combustion pressure sensor, a boost pressure sensor, and an exhaust pressure sensor.

8. The method of claim 1, wherein in calculating the second virtual sound, the controller collects the motor load data based on at least one of a motor vibration sensor, a voltage sensor, and a current sensor.

* * * * *